Patented July 28, 1936

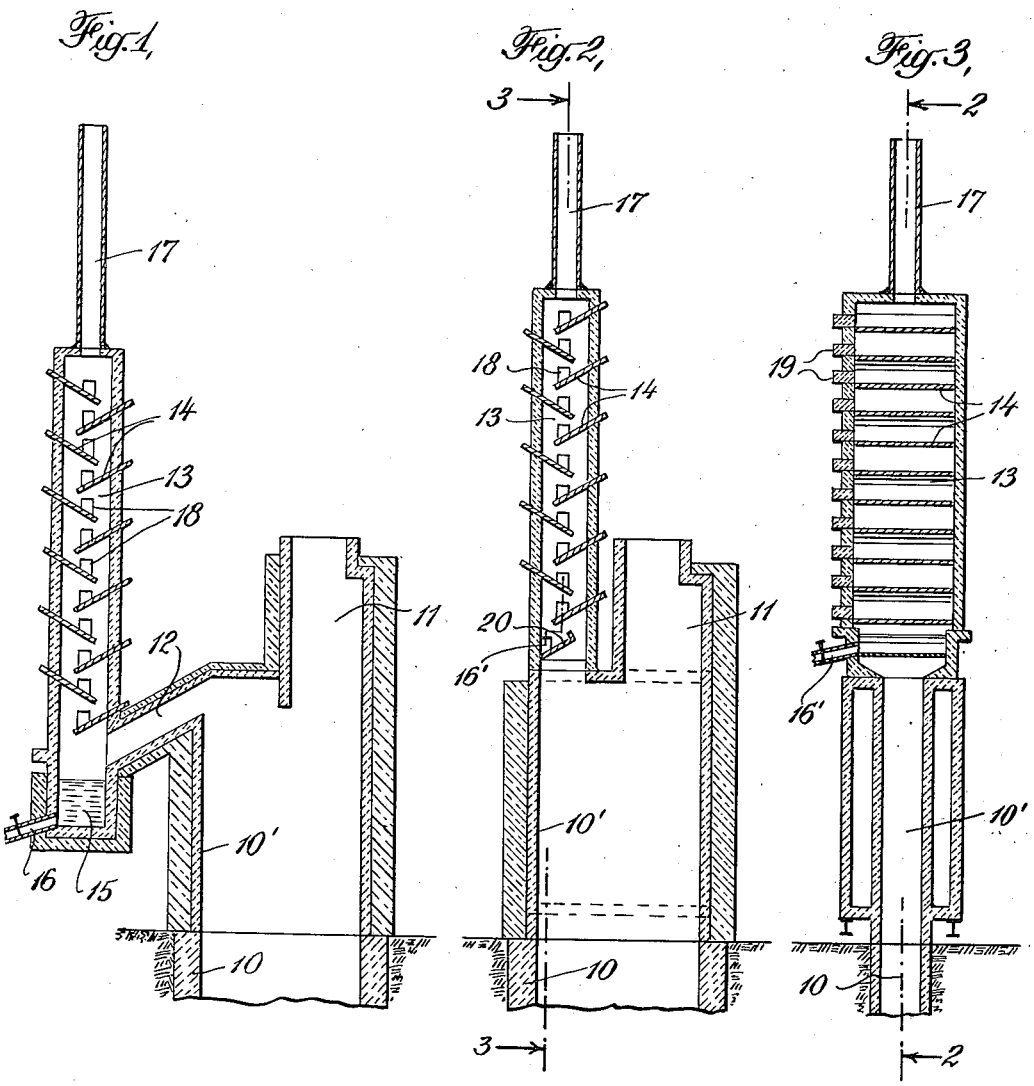

2,048,863

UNITED STATES PATENT OFFICE 2,048,863

CONDENSING ZINC VAPOR

Erwin C. Handwerk and George T. Mahler, Palmerton, Pa., assignors to The New Jersey Zinc Company, New York, N. Y., a corporation of New Jersey Application April 17, 1933, Serial No. 666,438

10 Claims. (Cl. 75—88)

This invention relates to the condensation of zinc vapor and has for its object the provision of an improved method of and apparatus for condensing zinc vapor. The invention is particularly adapted for the condensation of zinc vapor from relatively large volumes of gases derived from a continuously operated reducing or redistillation furnace.

The zinc vapor derived from a smelting or reducing operation is admixed with other gases, mainly carbon monoxide with some hydrogen and nitrogen. The function of the condenser is to efficiently condense the zinc vapor to a liquid coalesced state out of this mixture of gases. The presence of more than a small amount of carbon dioxide produced in the reducing operation hinders the efficient condensation of the zinc vapor to liquid, by oxidizing part of the zinc vapor to zinc oxide, with consequent formation of zinc dust. At the temperatures necessary for efficient condensation of zinc vapor, it is impossible to avoid the formation of some zinc oxide and/or blue powder from a gaseous mixture containing a large percentage of carbon monoxide, even if no appreciable amount of carbon dioxide is produced by the reducing operation itself. This is due to the fact that carbon monoxide decomposes into carbon and carbon dioxide at condensing temperatures. The resulting carbon dioxide thereupon reacts with the zinc vapor forming zinc oxide and/or blue powder.

The present invention aims to provide a method of and apparatus for condensing to molten metal the zinc vapor supplied by a zinc smelting retort of large capacity, such as a vertical zinc retort, in which the collection or accumulation of blue powder in the condenser is substantially reduced, as compared with heretofore customary practices. A further object of the invention is the provision of a condenser occupying relatively small floor area in proportion to its condensing capacity. Other objects and advantages of the invention will be pointed out in the course of the following description.

In accordance with the method of the invention, the zinc vapor is passed upwardly in a tortuous path through an elongated condensing chamber arranged with its elongated axis in an upright, and preferably vertical, position. The molten zinc metal condensing in the chamber flows by gravity back through the chamber, in contact with the ascending vapor, in thin downwardly directed films alternating with precipitate falls of molten metal from film to film. Preferably, the contemplated countercurrent flow of vapor and molten zinc metal through the condensing chamber in the manner characteristic of the invention results from the provision within the condensing chamber of a series of downwardly inclined and overlapping baffles in vertically spaced relation to one another. The molten zinc metal condensing in the chamber is collected in an appropriate sump near the base of the chamber. Preferably, the spent gases are exhausted at such a height above the condenser inlet that a positive up-draft is maintained through the condensing chamber.

The novel features of the invention will be most readily understood from the following description taken in connection with the accompanying drawing, in which Fig. 1 is a vertical section of a condenser embodying the invention; Fig. 2 is a vertical section of a somewhat modified arrangement of the condenser, and Fig. 3 is a vertical section on the section line 3—3 of Fig. 2.

In the accompanying drawing, the condenser of the invention is illustrated in operative association with a vertical retort 10 for smelting a charge of zinciferous material and carbonaceous reducing agent. The vertical retort has an upper extension 10' provided with an overhead charging tube 11 and a lateral off-take 12 for the gaseous product of the smelting or reducing operation taking place in the retort 10.

The elongated condensing chamber 13 is rectangular in cross-section and is disposed in an upright, and preferably vertical, position, thus constituting in effect an upright column or tower. The chamber is built of silicon carbide brick or the like. The condensing chamber 13 is provided with a series of staggered downwardly sloping baffles 14, which may for example be set so as to slope downward at an angle of 30°. The baffles are preferably of such length as to project beyond the center line of the condensing chamber, so that ascending vapor and descending molten metal are compelled to take a tortuous or zig-zag path through the condensing chamber. As illustrated in the drawing, there is a vertical series of spaced transverse baffles fastened into the walls of the chamber and extending downwardly from one side of the condensing chamber to within a short distance of the opposite side, alternating with similar transverse and vertically spaced baffles extending downwardly from the other side of the chamber. As will be apparent from the drawing this arrangement prevents the exposure of the joints between the baffles and the chamber walls to a hydrostatic head of molten zinc.

The condensing chamber 13 is provided at its base with a sump 15 for collecting the molten metal condensing in the chamber. The sump is provided with a tap hole 16 through which the molten zinc metal may be periodically tapped. A stack 17 is mounted on top of the condensing chamber 13 and communicates therewith, and exhausts the permanent or spent gases at a sufficient elevation above the charging level of the retort 10 to maintain a positive up-draft through the chamber 13. Clean-out ports 18 are provided at various levels in the chamber 13, and are normally closed by brick 19, so placed that they can be conveniently removed whenever it is necessary or desirable to clean out the condenser.

In Figs. 2 and 3 of the drawing, the condenser is mounted directly above the retort 10 and at one side of the charging tube 11. The construction of the condenser is substantially the same as in Fig. 1 of the drawing, and similar parts are designated by the same reference characters. In the condenser of Figs. 2 and 3, the molten metal sump is formed by an upwardly projecting tile 20 mounted at one side of the condenser. All of the molten metal condensed in the chamber 13 is deflected by the lowermost of the sloping baffles 14 into the sump formed by the upwardly projecting tile 20. A tap hole 16' is provided for withdrawing molten metal as desired from the sump.

In carrying out the invention in the apparatus illustrated in the drawing, zinc vapor mixed with carbon monoxide, nitrogen and other gases passes from the zinc reducing or smelting retort 10 into the bottom of the condensing column or tower 13 (in the apparatus of Fig. 1, after first passing through the downwardly inclined off-take 12). As the gaseous stream ascends the condensing column substantially all of its zinc vapor content is condensed to molten zinc metal. The molten zinc metal deposits upon the sloping baffles 14 and flows downwardly over these baffles in thin films. The molten metal falls precipitately or cascades from baffle to baffle directly in the path of the ascending gaseous stream. Both the ascending gaseous stream and the descending molten zinc metal are compelled to take a zig-zag or tortuous path on account of the overlapping arrangement of the baffles. The heat dissipation characteristics of the condensing column are such that when the gaseous stream reaches the top of the column it is cooled to a temperature of about 550 to 600° C., at which temperature its zinc vapor content is small. The uncondensable or spent gas, together with such remnant of zinc vapor as remains uncondensed, escapes through the stack 17.

The sloping baffles 14 are continuously rinsed by the descending shower of molten zinc metal so that little or no blue powder can collect thereon. The rinsing action of the descending molten metal promotes the coalescence of the droplets initially formed during the condensation, so as to lessen the formation of blue powder or zinc dust, and likewise tends to transform to liquid zinc any zinc dust that may be formed, so that the accumulation of zinc dust or blue powder in the condenser is extraordinarily small.

The condenser of the invention has a high degree of stack draft, due to its chimney-like construction. The stack draft may be further increased by mounting on top of the condensing chamber a tall stack for discharging the uncondensable gases. The high stack draft of the condenser results in certain operating advantages as follows:

During the operation of a vertical zinc smelting retort the charging tube 11 is ordinarily covered with a cap and sealed so as to prevent the escape of zinc vapor, that is to say to force all the zinc vapor to pass into the condenser. However, when the cap is removed, e. g. for charging the retort, the zinc vapor ordinarily tends to escape and is thus lost. The high stack draft of the condenser of the invention tends to draw the bulk of the zinc vapor into and through the condensing column even when the charge cap is removed, and thus prevents a substantial loss of zinc.

Furthermore, even in normal operation of the retort 10 with the cap covering the charging tube 11, the stack draft of the condenser applies suction to the retort and thus decreases the pressure within the retort due to the evolution of zinc vapor from the charge undergoing reduction or smelting. This suction makes it possible to introduce with greater facility gases into the bottom of the retort for the purpose of sweeping zinc vapor out of the cooling residue about to be discharged, in order to decrease the loss of zinc in the residue. Furthermore, leakage due to higher pressure in the retort than outside is decreased by the suction.

The condenser of the invention tends to collect molten zinc with a cadmium content substantially lower than the cadmium content of the vapors that enter it, in view of the fact that the molten condensed metal is collected at the hot lower end of the condenser, and thus under conditions that are favorable for the volatilization of cadmium from the condensed metal.

We claim:

1. An apparatus for condensing zinc vapor comprising an elongated condensing chamber having walls refractory to molten zinc and arranged with its elongated axis in an upright position, a series of downwardly inclined and overlapping baffles arranged in said chamber in vertically spaced relation to one another and projecting into said walls, means near the base of said chamber for collecting molten metal condensing therein, and a stack communicating with said chamber and extending a sufficient distance above the top thereof to provide a positive up-draft through the chamber.

2. An apparatus for condensing zinc vapor comprising an upright tower, a multiplicity of downwardly inclined and vertically spaced transverse baffles arranged within said tower to provide tortuous paths for descending molten metal and ascending vapor and joined to the walls of said tower in such a way that no joint is exposed to a hydrostatic head of molten metal, means near the base of said tower for collecting molten metal condensing therein, and a stack mounted on top of said tower and communicating therewith.

3. Apparatus for condensing zinc vapor comprising an upright tower having walls refractory to molten zinc, means for introducing zinc vapor into said tower near its base, means for creating a draft upwardly through said tower, means for dissipating substantially all of the latent heat of vaporization of metallic vapor introduced into said tower, a plurality of transverse baffles refractory to molten zinc extending downwardly from opposite sides of said tower, the baffles of each side alternating with and overlapping those on the opposite side of the tower, and means for withdrawing molten zinc from the base of the tower.

4. In a process for the production of metallic zinc in which zinc is condensed and separated out of a gaseous mixture containing zinc vapor and carbon monoxide as molten zinc and blue powder, the improvement which comprises condensing the zinc vapor to molten zinc in a rising tortuous current of the gaseous mixture in a chamber having a series of overlapping vertically spaced surfaces alternately sloping downward in opposite directions and washing blue powder from such surfaces by continuously passing thin films of molten zinc over said surfaces.

5. In a process for the production of zinc metal in which zinc vapor mixed with carbonaceous gases is condensed as molten zinc and blue powder, the improvement which comprises passing the zinc vapor upwardly in a tortuous path through a series of screens of free falling molten zinc, condensing the zinc vapor to molten zinc and utilizing the molten zinc in the form of a series of thin sloping films alternately descending in opposite directions to wash down blue powder.

6. An apparatus for condensing zinc vapor which comprises an upright tower having walls refractory to molten zinc, the heat conductivity of said walls being such as to permit the dissipation of substantially all the latent heat of vaporization of zinc vapor introduced into the tower, means for introducing zinc vapor into said tower, a plurality of transverse baffles extending downwardly from opposite sides of the tower and fitted into sloping slots in the tower walls only at their upper ends, the baffles on each side alternating with those on the opposite sides, and means for withdrawing uncondensible gases from the tower.

7. In a process for the production of metallic zinc in which the zinc is condensed and separated out of a gaseous mixture containing zinc vapor and carbonaceous gas as molten zinc and blue powder in a chamber provided with a plurality of sloping condenser surfaces at different elevations, the improvement which comprises washing off blue powder deposited on the surfaces with a series of thin downwardly sloping films of molten zinc flowing over the surfaces, said molten zinc dropping from film to film in precipitate falls.

8. In a process for the production of metallic zinc in which the zinc is condensed and separated out of a gaseous mixture containing zinc vapor and carbonaceous gas as molten zinc and blue powder in a chamber provided with a plurality of sloping condenser surfaces at different elevations, the improvement which comprises washing off blue powder deposited on the surfaces with a series of thin downwardly sloping films of molten zinc flowing over said surfaces, said molten zinc dropping from film to film in precipitate falls, and passing the gaseous mixture upwardly through said precipitate falls of molten zinc.

9. In a process for the production of metallic zinc in which the zinc is condensed and separated out of a gaseous mixture containing zinc vapor and carbonaceous gas as molten zinc and blue powder in a chamber provided with a plurality of sloping condenser surfaces at different elevations, the improvement which comprises condensing the zinc vapor to molten zinc in a rising tortuous current of the gaseous mixture within the chamber by removing heat therefrom and washing off blue powder deposited on said surfaces with a series of thin downwardly sloping films of molten zinc flowing over the surfaces, and dropping said molten zinc from film to film in precipitate falls.

10. In a process for the production of molten zinc in which the zinc is condensed and separated out of a gaseous mixture containing zinc vapor and carbonaceous gas as blue powder and molten zinc in a chamber having a series of sloping condenser surfaces at different elevations, the improvement which comprises washing off the blue powder deposited on the surfaces with thin downwardly sloping films of molten zinc flowing over the surfaces, passing molten zinc from film to film in a series of precipitate falls and collecting the molten zinc after it has passed over a plurality of the condenser surfaces.

ERWIN C. HANDWERK.
GEORGE T. MAHLER.